US011538130B2

(12) United States Patent
Salloum

(10) Patent No.: US 11,538,130 B2
(45) Date of Patent: Dec. 27, 2022

(54) SYSTEM AND METHOD FOR LUGGAGE DELIVERY DISCREPANCY DETECTION

(71) Applicant: Kinan Muhsin Salloum, Abu Dhabi (AE)

(72) Inventor: Kinan Muhsin Salloum, Abu Dhabi (AE)

(*) Notice: Subject to any disclaimer, the term of this patent is extended or adjusted under 35 U.S.C. 154(b) by 139 days.

(21) Appl. No.: 16/994,610

(22) Filed: Aug. 16, 2020

(65) Prior Publication Data

US 2021/0104002 A1 Apr. 8, 2021

(30) Foreign Application Priority Data

Oct. 3, 2019 (AE) ............................ P6001421/2019

(51) Int. Cl.

| G06Q 50/28 | (2012.01) |
|---|---|
| H04W 4/80 | (2018.01) |
| G06K 7/10 | (2006.01) |
| G07C 9/29 | (2020.01) |
| G08B 7/06 | (2006.01) |
| G06Q 50/30 | (2012.01) |

(52) U.S. Cl.
CPC ......... *G06Q 50/28* (2013.01); *G06K 7/10366* (2013.01); *G07C 9/29* (2020.01); *G08B 7/06* (2013.01); *H04W 4/80* (2018.02); *G06Q 50/30* (2013.01)

(58) Field of Classification Search
CPC .... G06K 7/10366; G06Q 50/28; G06Q 50/30; G07B 15/00; G07C 9/00571; G07C 9/00896; G07C 9/27; G07C 9/29; G08B 7/06; H04W 4/029; H04W 4/80
See application file for complete search history.

(56) References Cited

U.S. PATENT DOCUMENTS

| 6,044,353 A * | 3/2000 | Pugliese, III | G06Q 10/08 705/13 |
|---|---|---|---|
| 2006/0220828 A1* | 10/2006 | Charlot, Jr. | G06K 19/0723 340/505 |
| 2009/0219169 A1* | 9/2009 | Herwats | G07C 9/27 340/8.1 |
| 2013/0285806 A1* | 10/2013 | Yano | G06Q 10/04 340/521 |

* cited by examiner

*Primary Examiner* — Omer S Khan

(57) ABSTRACT

A luggage discrepancy detection system comprising smart tags each is having a unique identity, a smart tag system server and an exit control system comprising tag scanners and a controlled exit. The system server associates unique identity of the tags with a unique passenger identifier. The total number of the tags being not less than the total pieces of the luggage belonging to the passenger. A count of the total number of the tags can be determined from the unique identity of any of the tags. The exit control system sends to the server a scan data comprising the unique identity of the detected tags during scanning of an exit space. The server generates an exit instruction on finding a count of the detected tags as less than the count of the total number of the tags determined from the unique identity of any detected tags during a scan time.

16 Claims, 3 Drawing Sheets

SYSTEM AND METHOD FOR LUGGAGE DELIVERY DISCREPANCY DETECTION

CROSS-REFERENCE TO RELATED APPLICATION

This application claims the benefit of UAE Patent Application No. MOE-DIP-92-2035506-20191003 (filing number P6001421/2019), filed Oct. 3, 2019 the contents of which are incorporated herein by reference.

FIELD OF THE INVENTION

The present invention relates to luggage identification and tracking system. More particularly, the present invention relates to automatic detection of luggage mismatch with respect to luggage owner.

BACKGROUND OF THE INVENTION

Various luggage identification, tracking and control methods are used by airlines and airports across the world. Conventionally, a passenger has to check his or her luggage in at the airline check-in counter at the airport for the departing flight. A tag having information corresponding to the passenger and flight details is generated by an airline staff and it is placed on each individual piece of luggage. A counter foil of the luggage tag is given to the passenger along with the boarding pass by the airline staff. The luggage tag is then used for identification and tracking of the luggage till the time the luggage is collected by the passenger at the destination airport. However, the conventional system of luggage delivery or collection at the destination airport suffers several drawbacks. Presently, there exists no fail-safe method which can prevent a person from collecting a wrong piece of luggage from the luggage collection area or to prevent a person from leaving the airport terminal without collecting his/her registered luggage. Also, the prior art system and method do not provide an efficient and cost effective way to prevent luggage being stolen from the collection area. All these scenarios cause inconvenience to the traveler, results in loss of time and increase in expenses for both the traveler and the airline.

Thus, to address the above mentioned issues, there exists a need to provide a system and method for automatic detection of luggage mismatch.

OBJECTS OF THE INVENTION

An object of the present invention is to provide a system and method for enhancing luggage security.

Yet another object of the present invention is to provide a system and method for preventing luggage mismatch.

Still another object of the present invention is to provide a system and method for preventing luggage being left behind by luggage owners intentionally or unintentionally.

Another object of the present invention is to provide a system and method for luggage identification.

Yet another object of the present invention is to provide a system and method for tracing missing luggage.

Still another object of the present invention is to provide a system and method for preventing luggage theft.

These as well as other objects of the present invention are apparent upon inspection of this specification, including the drawings and appendices attached hereto.

SUMMARY OF THE INVENTION

The following presents a simplified summary in order to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

The present invention is directed to a system and a method for preventing discrepancy in luggage delivery/collection at passenger terminals or at other similar places. In accordance with an embodiment of the present invention, when a passenger checks-in at a passenger terminal or remotely, luggage identification tags/smart tags each having a unique identity is issued against the luggage. A smart tag system server of the present invention is configured to ensure that the total number of the smart tags being issued together is never less than the total pieces of the luggage belonging to the passenger as registered through a graphical user interface on a client device provided by the smart tag system server during the check-in process. One piece of the smart tag is attached to each piece luggage and also to an item such as boarding pass or passport carried by the passenger. The smart tag system server is configured to associate the unique identity of each of the smart tags issued together with a unique identifier of the passenger during check-in. An exit control system comprising one or more tag scanners is installed at an exit of luggage collection/delivery area at an arrival terminal. The exit control system is communicably connected to the smart tag system server and the scanner are configured to scan an exit space of luggage delivery/collection area to detect one or more of the smart tags when a person passes through the exit space with a piece of tagged luggage. The exit control system transmits a scan data comprising the unique identity of any tag detected by the scanner in the exit space during a predetermined/specific scan time. The smart tag system server analyzes the scan data and determines a count of the total number of the smart tags issued along with the detected one or more tags from the unique identity of the detected one or more tags. If the smart tag system server finds during the scan time a count of the detected one or more smart tags as less than the count of the total number of smart tags determined from unique identity of any of the detected one or more smart tags, it then generates an exit action instruction. The exit action instruction may comprise an instruction to raise an audible and/or visible alarm, an instruction to open or close a controlled exit and/or an instruction to send notification to a remote client device.

BRIEF DESCRIPTION OF THE DRAWINGS

In order to describe the manner in which features and other aspects of the present disclosure can be obtained, a more particular description of certain subject matter will be rendered by reference to specific embodiments which are illustrated in the appended drawings. Understanding that these drawings depict only typical embodiments and are not therefore to be considered to be limiting in scope, nor drawn to scale for all embodiments, various embodiments will be described and explained with additional specificity and detail through the use of the accompanying drawings in which.

DETAILED DESCRIPTION OF THE INVENTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as not to obscure the present invention.

Figure 1A:
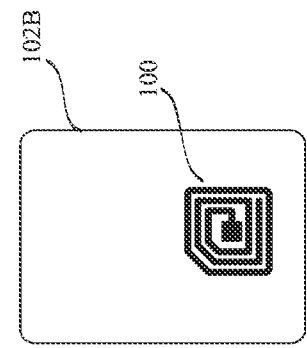
FIG. 1A illustrates an exemplary unique identifier tag/smart tag in accordance with an embodiment of the present invention.
Figure 1B:
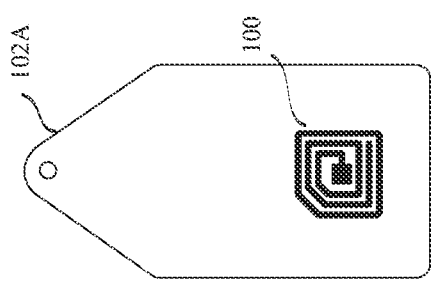
FIG. 1B illustrates another exemplary unique identifier tag/smart tag in accordance with an embodiment of the present invention.
Figure 1C:
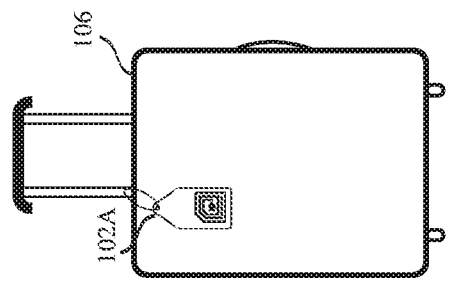
FIG. 1C illustrates unique identifier tag/smart tag of FIG. 1A attached to a luggage in accordance with an embodiment of the present invention.
Figure 1D:
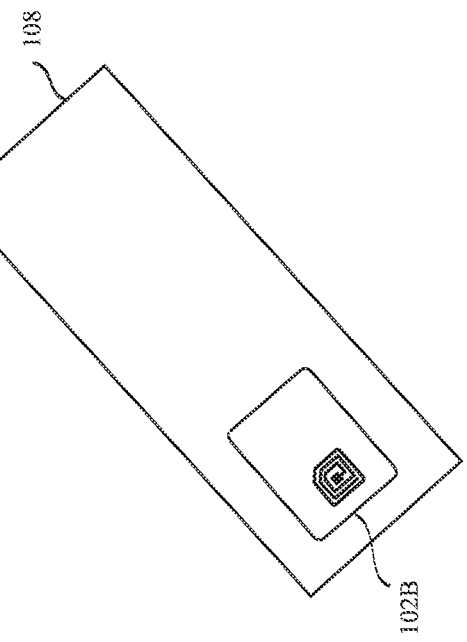
FIG. 1D illustrates unique identifier tag/smart tag of FIG. 1B attached/pasted to a document such as boarding pass/passport in accordance with an embodiment of the present invention.

FIG. 1A and FIG. 1B depict two versions 102A and 102B respectively of the unique luggage identifier tag of the present invention, hereinafter referred to as "smart tag". The smart tag 102A or 102B comprise a wireless tracking module 100. The wireless tracking module 100 may comprise radio frequency identification (RFID) module, global positioning system (GPS) module, Bluetooth module, ZigBee module, General Packet Radio Service (GPRS) module, GSM module, LTE module or any other suitable wireless communication module. Every smart tag, by virtue of its wireless tracking module 100, can have a universal unique identity which can be factory assigned or server/client device assigned. The unique identity of the wireless tracker module 100 is machine-readable and may be recognizable in any of the frequencies which lie within the electromagnetic spectrum including radio frequency. The wireless tracker module 100 can be passive one or an active one. The smart tags can come in various size, shapes and forms. For example, smart tag 102A is tag which is attachable to an object such as a luggage 106 of FIG. 1C with a help of a fastener whereas smart tag 102B is attachable to an object such as a boarding pass or passport 108 by pasting as shown in FIG. 1D.

Figure 2:
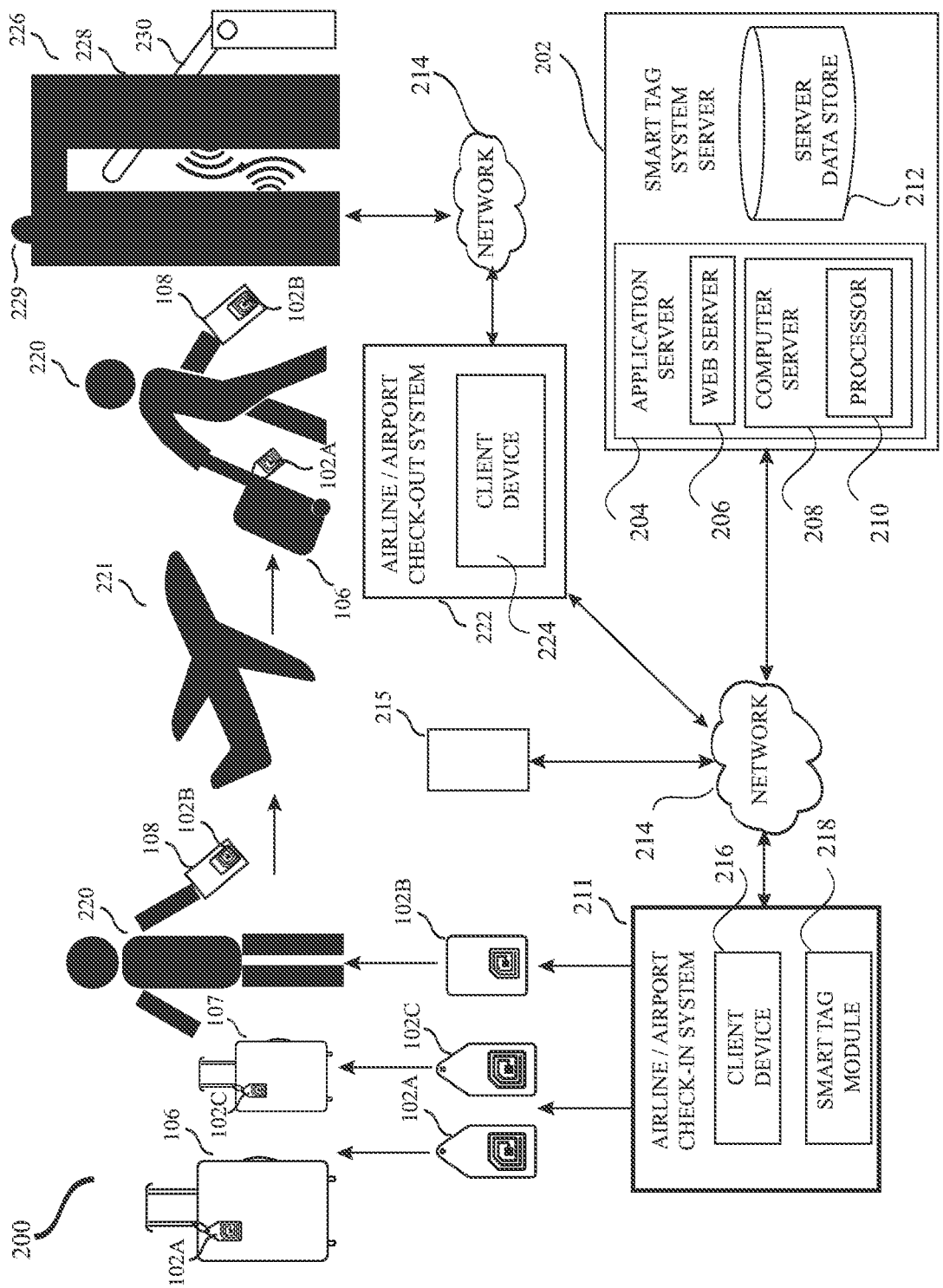
FIG. 2 illustrates an exemplary general environment for implementation of the luggage delivery discrepancy detection system of the present invention.
Figure 3:
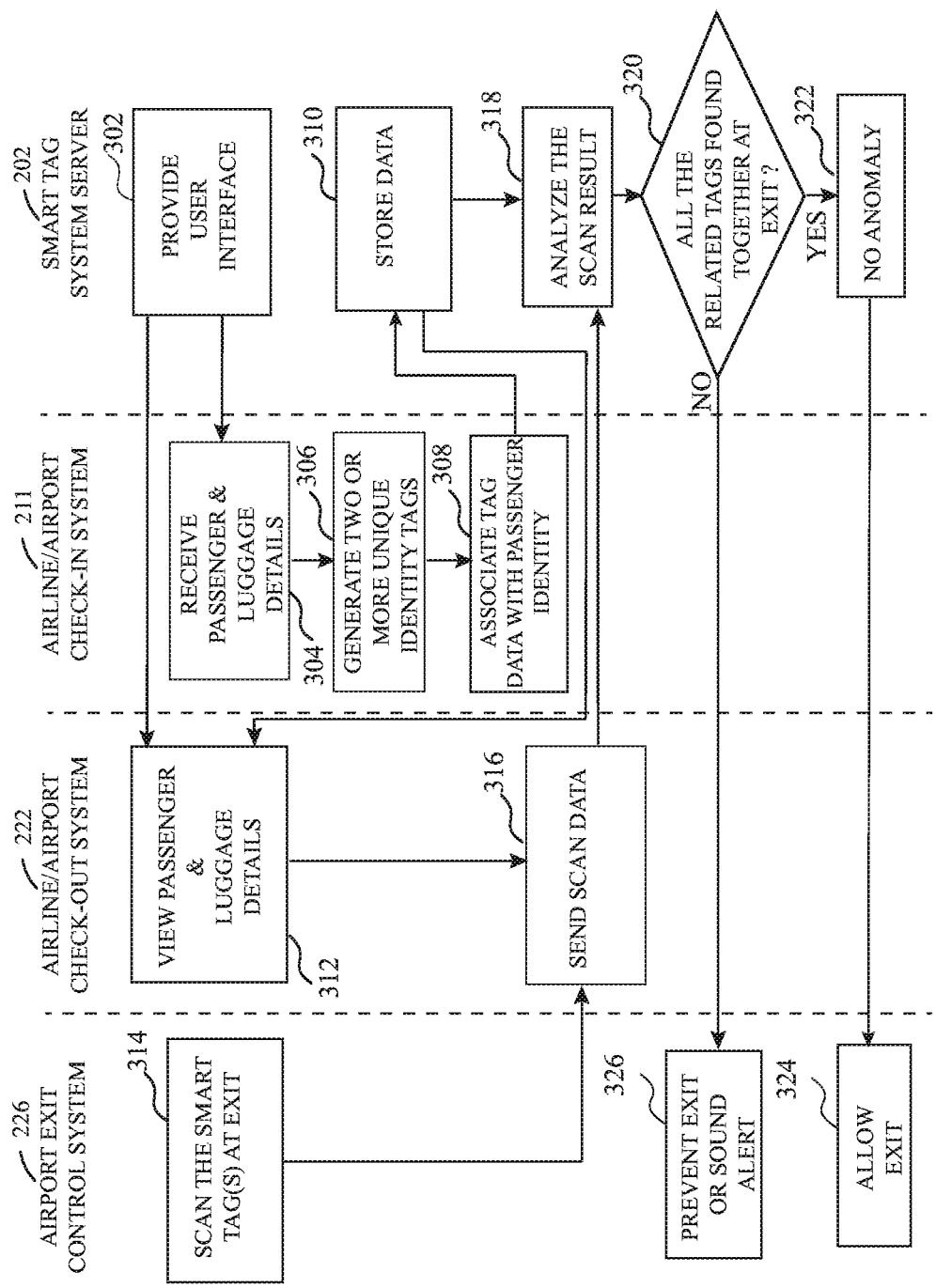
FIG. 3 illustrates a flowchart depicting the general steps associated with the method in accordance with an embodiment of the present invention.

FIG. 2 illustrates the general architecture of a system 200 hereinafter referred to as "smart tag system", for preventing discrepancy/theft in delivery/collection of luggage at a passenger terminal using the smart tags that operates in accordance with one embodiment of the present invention. The smart tag system 200 comprises two or more smart tags 102A, 102B or 102C, a smart tag system server 202, an airline/airport check-in system 211, an airline/airport check-out system 222, one or more mobile client device 215 and one or more exit control system 226 all of which are communicably connected with each other. The system 200 further comprises one or more client devices such as 216 and 224 as part of airline/airport/carrier check-in/check-out system. Although, only three client devices 215, 216 and 224 are shown connected to the smart tag system server 202 via a network 214 it is to be understood that there can be a plurality of client devices connected to the smart tag system server 202. The smart tag system server 202 communicates with the client devices over the network 214 to present a graphical user interface for the smart tag system of the present invention. The user interface of the smart tag system of the present invention can be presented on the client devices 216 (which can be part of an airline/airport check-in system 211), 224 (which can be part of an airline/airport check-out system 222) and 215 (which can be part of the both check-in and check-out system) through a web browser or through a native application communicating with the smart tag system server 202 and is used for displaying, entering and/or managing data such as number of passenger and luggage, smart tag unique identities and passenger identifiers and for tracking and monitoring the smart tags etc. As used herein, the term "network" generally refers to any collection of distinct networks working together to appear as a single network to a user. The term also refers to the so-called world wide "network of networks" or Internet which is connected to each other using the Internet protocol (IP) and other similar protocols. As described herein, the exemplary public network 214 of FIG. 2 is for descriptive purposes only and it may be wired or wireless. Although, the description may refer to terms commonly used in describing particular public networks such as the Internet, the description and concepts equally apply to other public and private computer networks, including systems having architectures dissimilar to that shown in FIG. 2. The inventive idea of the present invention is applicable for all existing cellular network topologies or respective communication standards, in particular GSM, UMTS/HSPA, LTE and future standards.

The smart tag system server 202 includes an application server or executing unit 204 and a data store 212. The application server or executing unit 204 comprises a web server 206 and a computer server 208 that serves as the application layer for the present invention. It would be obvious to any person skilled in the art that, although described herein as the data being stored in a single database, different separate databases can also store the various data and files of multiple users.

The Web server 206 is a system that sends out Web pages containing electronic data files in response to Hypertext Transfer Protocol (HTTP) or similar requests from remote browsers (i.e. browsers installed in the client devices 216 or 224) or in response to similar requests made through a mobile app or mobile application of the present invention installed on a mobile computing device 215 which acts as a client device. The web server 206 can communicate with a native app of the present invention and/or with a web browser installed on client devices 215, 216 and 224 to provide the graphical user interface required for the smart tag system 200.

Although, the description of the smart tag system 200 may refer to terms commonly used in describing particular computer servers, the description and concepts equally apply to other processing systems, including systems having architectures dissimilar to that shown in FIG. 2.

The mobile application or "mobile app" is a computer program that may be downloaded and installed in mobile computing device 215 using methods known in the art. Hereinafter, the mobile app of the present invention is referred to as "smart tag app". The smart tag app enables one or more persons to do various tasks related to the smart tag system of the present invention. Examples of mobile computing device 215 may include, but not limited to mobile devices, tablets, hand-held or laptop devices, smart phones, personal digital assistants or any similar devices.

The client devices 215, 216 and 224 may include various electronic components known in the art for this type of devices. In this embodiment, the client devices 215, 216 and 224 may include a device display, a camera, a scanner, a processor, user input device (e.g., touch screen, keyboard and/or other form of input device known in the art), a device transceiver for communication, a computer readable device memory and the smart tag app operably installed in the computer readable memory (not shown in figure). For purposes of this application, the term "transceiver" is defined to include any form of transmitter and/or receiver known in the art, for cellular, WIFI, radio, and/or other form of wireless or wired communication known in the art. Obviously, these elements may vary, or may include alternatives known in the art, and such alternative embodiments should be considered within the scope of the present invention.

In one embodiment, the check-in system 211 may further comprise a smart tag module 218. The smart tag module is configured to read/write smart tag data. For example, the smart tag module 218 can be used to read the factory set data from smart tags 102A, 102B or 102C and/or to write data such as unique identity (provided by the smart tag system server 202) and passenger/luggage details to the smart tags 102A, 102B or 102C.

In a preferred embodiment, the exit control system 226 comprises one or more tag scanners/readers 228 configured to detect RFID and/or Bluetooth tags or other wireless tags, one or more audible/visual alarms 229, and one or more controlled exit 230. The tag scanners 228 are devices that transmit and receive radio waves in order to communicate with the smart tags. The tag scanners can be fixed or mobile. The controlled exit 230 comprises an automatically openable/closable gate. The exit control system 226 is installed at an exit of a luggage delivery/collection area of a passenger terminal in such a way that every person leaving the luggage delivery/collection area has to pass through the exit control system 226, preferably one at a time with luggage.

Although, the method of the present invention is explained below with respect to an exemplary situation of a passenger travelling by flight from one airport to another, the method will be applicable to other modes of travel as well. Reference to FIGS. 1A to 3, in this exemplary situation, a passenger 220 is travelling with two luggage 106 and 107. Using the graphical user interface provided at the client device 216 of check-in system 211 (operated by airline/airport staff or self check-in) as in step 302 of FIG. 3, the details related to the passenger 220 and the luggage 106 and 107 carried by the passenger are fed to the smart tag system server 202 as in step 304. After registration, a group of smart tags are issued, as in step 306, by the smart tag module 218 through the check-in system 211 corresponding to the numbers of luggage which have been checked-in. The issued smart tags may have pre-assigned/factory set unique identities or such unique identities are generated by the smart tag system server 202 and written to the smart tags by the smart tag module 218. The smart tag system server 202 is configured to make sure that the total numbers of smart tags issued together against a particular passenger is not less than the total number of luggage checked-in/carried by the passenger. In a preferred embodiment, the total numbers of smart tags issued is equal to the number of luggage plus the number of passenger(s) who have checked-in individually or in a group. In the present example, the passenger 220 is carrying two luggage 106 and 107. Accordingly, the smart tag system server 202 allows issuance of not less than three numbers of smart tags (one each for the two luggage and the passenger). The data related to this group of smart tags 102A, 102B and 102C issued together including their unique identities are then associated with a unique identifier of the passenger 220 by the smart tag system server 202 as in step 308 and the relevant data is stored in the server data store 212 as in step 310. This unique passenger identifier can be, for example, the ticket number or the PNR of the passenger 220. In another embodiment, the entire check-in process can be carried out using a mobile computing device 215.

A smart tag is attached to each piece of the luggage and to the passenger (to any item carried by the passenger). A suitable type/dimension of smart tag is selected for attaching to luggage and to the passenger. For example, smart tags 102A and 102C can be attached to the luggage 106 and 107 respectively with a fastener and smart tag 102B is pasted to the boarding pass 108 issued to the passenger 220. The passenger then proceeds to boarding the aircraft 221 in the usual way and the luggage are loaded on to the aircraft or carried by the passenger in the cabin.

At the destination airport, after arrival of the aircraft 221, the passenger 220 deboards and proceeds to the luggage delivery/collection area at the passenger terminal. The passenger 220 then collects his/her luggage from the luggage delivery/collection area and passes through the exit control system 226 installed at the exit of the luggage delivery/collection area.

In the context of the present example, three scenarios may arise with respect to the luggage carried by the passenger 220. In the first scenario, the passenger 220 collects both the luggage 106 and 107 and passes through the exit control system 226 carrying the boarding pass 108 along. While passing through the exit control system 226, the tag scanners 228 detect all the three smart tags—102A with luggage 106, 102C with luggage 107 and 102B with the boarding pass 108 as in step 314. The airline/airport check-out system 222 is configured to monitor and control this exit process as in step 312 and client device 224 may be used to this effect. The scan data comprising the unique identities of the detected smart tags 102A, 102B and 102C is then sent to the smart tag system server 202 as in step 316 of FIG. 3. The processor 210 analyzes the entire scan data received from the check-out system 222 during a specific/pre-defined scan time as in step 318. The time required by a passenger to pass through the exit control system 226 would be different from the time required by a group of passengers from the same family with large number of luggage. Therefore, the specific scan time is set to cover the time period which may be required for an individual passenger or passengers belonging to a single group as registered in the smart tag system 202 to pass through the exit control system 226. Accordingly, in a preferred embodiment, the smart tag system server 202 is configured to increase or decrease the period of time (scan time) which the smart tag system server 202 should consider for analyzing the scan data to determine the number of detected smart tags. If the number of luggage for a passenger and/or the number of passengers checking-in as a single group (a family of four having same or different PNR, for example) is more large then the scan time period should be increased proportionately so that the scan time covers the total time required by the passenger(s) to pass through the scanners or the exit control system 226. In a preferred embodiment, the scan time so determined by the smart tag system server is linked to the unique identity of each smart tag issued together or the passenger identity so that the smart tag system server 202 can find out the scan time it should consider for analyzing the scan data from the unique identity of any of the smart tags detected by the tag scanners i.e. the system knows how much time it should give a passenger to pass through the scanners before raising an alarm or closing the exit.

For any detected smart tag, the smart tag system server 202 is configured to determine the count of total number of smart tags that were issued together with the detected smart tag during the check-in. This is done by the smart tag system server 202 by retrieving the data from the server data store 212 against the unique identity of the detected smart tag. Also, as the smart tag system server 220 associates unique identity of each smart tag issued together with each other, the unique identity of every smart tag can be determined from the unique identity of any of the smart tags of the group of issued smart tags. So, in case of the present example, using the unique identity of any of the smart tags 102A, 102B or 102C, the smart tag system server 202 determines that the count of the total number of smart tags issued for passenger 220 is 3 (three). Therefore, in the present example, when the smart tag system server 202 finds during the analysis at step 320 that the number smart tags (which is three i.e. 102A, 102b and 102C) detected during a specific scan time is not less than the total number of smart tags issued with the detected smart tags 102A, 102B or 102C and/or that all of the smart tags issued together in the group during check-in with every detected smart tags are found in the scan data, no luggage discrepancy/anomaly is detected as in step 322 and the exit control system 226 allows exit of the passenger 220 as in step 324 as per an exit control action instruction sent by the smart tag system server 202.

In the second of the probable scenarios, the passenger 220 may leave behind any or all of his/her luggage at the luggage delivery/collection area intentionally or unintentionally. In this scenario, the tag scanners 228 of the exit control system 226 would still detect the smart tag attached to the boarding pass 102B or any of the tagged luggage carried by the passenger. The smart tag system server 202 would be able to find out that the total number of smart tags issued together with smart tag 102B or any other detected smart tag is not there in the scan data analyzed for a specific scan time. The smart tag system server 202 would also be able to determine the unique identities of the missing smart tags. The smart tag system server 202 would then initiate an exit control instruction. The exit control system 226 may raise an audible/visual alarm 229 as per the exit control instruction and/or close the controlled exit 230 as in step 326.

In the third scenario, the passenger 220 may try to leave the luggage delivery/collection area carrying one or more smart tagged luggage belonging to any other passenger(s) with or without carrying his/her own luggage. In this scenario also the smart tag system server 202 would be able to find out that there exists an anomaly by analyzing the data associated with the detected smart tag attached to the luggage of the other passenger being carried by the passenger 220. Even if the piece of luggage belonging to other passenger being carried by the passenger 220 is the single piece of luggage checked-in by the other passenger, the smart tag system server 202 would still be able to find out the discrepancy/anomaly because, in this scenario, the smart tag issued along with the detected smart tag and carried by the other passenger would be found missing from the scan data in a specific scan time period and the number of smart tags detected would be less than the count of total issued smart tags for the other passenger. The smart tag system server would again issue an exit control instruction which may include instruction to the exit control system 226 to raise an alarm and/or close the controlled exit. The exit control instruction may also include an instruction to automatically send a notification (a voice call or a text message, for example) to the client devices and/or to the mobile device 215 of the concerned persons as an alert. This third scenario is also applicable in the event of an attempt made by a non-passenger (or a passenger without tag on boarding pass or passport) to leave the luggage delivery/collection area with a smart tagged luggage of any passenger.

As explained above, the smart tag system 200 of the present invention provides some distinct advantages over the conventional luggage tracking systems and methods. The smart tag will solve a number of problems associated with luggage delivery at an arrival lounge. It can automatically prevent exit of a passenger from the luggage delivery/collection area if the passenger tries to leave the luggage delivery/collection area without carrying his/her luggage or if the passenger takes a wrong luggage with him/her through the exit control system of the present invention. The smart tag system can be integrated directly into the existing global airport luggage system or can be operated separately and independently.

The use of the terms "a" and "an" and "the" and similar referents in the context of describing the invention are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The terms "affixed", "fitted", "attached" are to be construed as partly or wholly contained within, attached to, or joined together, even if there is something intervening. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Flowchart is used to describe the steps of the present invention. While the various steps in this flowchart are presented and described sequentially, some or all of the steps may be executed in different orders, may be combined or omitted, and some or all of the steps may be executed in parallel. Further, in one or more of the embodiments of the invention, one or more of the steps described above may be omitted, repeated, and/or performed in a different order. In addition, additional steps, omitted in the flowchart may be included in performing this method. Accordingly, the specific arrangement of steps shown in FIG. 3 should not be construed as limiting the scope of the invention.

What is claimed is:

1. A method for prevention of luggage delivery discrepancy, said method comprising:

associating a unique identity of each of a plurality of smart tags with each of one or more unique passenger identifiers of one or more passengers of a group by a smart tag system server, a total number of said plurality of smart tags is being equal to a sum of (i) a total count of a number of one or more luggage belonging to said one or more passengers in said group and (ii) a total count of a number of said one or more passengers in said group;

setting a specific scan time period duration by said smart tag system server proportional to said total number of said plurality of smart tags;

associating by said smart tag system server a count of said total number of said plurality of smart tags and said specific scan time period duration to said unique identity of each of said plurality of smart tags and to each of said one or more unique passenger identifiers;

configuring said smart tag system server to determine a count of a number of smart tags of said plurality of smart tags detected by an exit control system in said specific scan time period duration; and generating an exit control instruction by said smart tag system server if said count of said number of smart tags detected by said exit control system within said specific scan time period duration is found to be less than said total number of said plurality of smart tags determined from said unique identity of any of said smart tags detected by said exit control system.

2. The method as in claim 1, wherein one of said plurality of smart tags is attached to each of said one or more luggage.

3. The method as in claim 1, wherein one of said plurality of smart tags is attached to each of said one or more passengers.

4. The method as in claim 1, wherein said plurality of smart tags are RFID tags or Bluetooth tags.

5. The method as in claim 1, wherein said exit control instruction includes an instruction to send a notification to a mobile device.

6. The method as in claim 1, wherein said exit control system comprising one or more audible and visible alarm and one or more controlled exit.

7. The method as in claim 6, wherein said exit control instruction makes said exit control system to raise said audible and visible alarm and to open or close said one or more controlled exit.

8. A system for prevention of luggage delivery discrepancy, said system comprising:
 a plurality of smart tags, each of said plurality of smart tags having a unique identity;
 an exit control system comprising one or more tag scanners, said one or more tag scanners being configured to scan an exit space to detect one or more of said plurality of smart tags present in said exit space; and
 a smart tag system server communicably connected to said exit control system, said smart tag system server configured to:
  associate said unique identity of said each of said plurality of smart tags with each of one or more unique passenger identifiers of one or more passengers of a group, a total number of said plurality of smart tags is being equal to a sum of (i) a total count of a number of one or more luggage belonging to said one or more passengers in said group and (ii) a total count of a number of said one or more passengers in said group;
  set a specific scan time period duration proportional to said total number of said plurality of smart tags;
  associate a count of said total number of said plurality of smart tags and said specific scan time period duration to said unique identity of each of said plurality of smart tags and to each of said one or more unique passenger identifiers;
 determine a count of a number of smart tags of said plurality of smart tags detected by an exit control system in said specific scan time period duration; and
 generate an exit control instruction if said count of said number of smart tags detected by said exit control system within said specific scan time period duration is found to be less than said total number of said plurality of smart tags determined from said unique identity of any of said smart tags detected by said exit control system.

9. The system as in claim 8, wherein one of said plurality of smart tags is attached to each of said one or more luggage.

10. The system as in claim 8, wherein one of said plurality of smart tags is attached to each of said one or more passengers.

11. The system as in claim 8, wherein said plurality of smart tags are RFID tags or Bluetooth tags.

12. The system as in claim 8, wherein said exit control instruction includes an instruction to send a notification to a mobile device.

13. The system as in claim 8, wherein said exit control system comprising one or more audible and visible alarm and one or more controlled exit.

14. The system as in claim 13, wherein said exit control instruction makes said exit control system to raise said audible and visible alarm and to open or close said one or more controlled exit.

15. The method as in claim 1, wherein said specific scan time period duration starts on detection of any of said plurality of smart tags by said exit control system.

16. The system as in claim 8, wherein said specific scan time period duration starts on detection of any of said plurality of smart tags by said exit control system.

* * * * *